US008382991B2

(12) United States Patent
Iannicelli

(10) Patent No.: US 8,382,991 B2
(45) Date of Patent: Feb. 26, 2013

(54) METHOD OF SORBING DISCOLORED ORGANIC COMPOUNDS FROM WATER

(75) Inventor: Joseph Iannicelli, Brunswick, GA (US)

(73) Assignee: J. I. Enterprises, Inc., Brunswick, GA (US)

( * ) Notice: Subject to any disclaimer, the term of this patent is extended or adjusted under 35 U.S.C. 154(b) by 0 days.

(21) Appl. No.: 12/796,066

(22) Filed: Jun. 8, 2010

(65) Prior Publication Data

US 2010/0243568 A1    Sep. 30, 2010

Related U.S. Application Data

(63) Continuation-in-part of application No. 11/277,282, filed on Mar. 23, 2006, now Pat. No. 7,763,566.

(51) Int. Cl.
*B01D 15/04* (2006.01)
*C02F 1/28* (2006.01)

(52) U.S. Cl. ..... 210/691; 210/690; 210/663; 423/658.5; 423/121; 423/138

(58) Field of Classification Search ................. 423/119, 423/121, DIG. 1, DIG. 18, 138, 658.5; 210/681, 210/688, 502.1, 912; 3/119, 121; 502/400, 502/406
See application file for complete search history.

(56) References Cited

U.S. PATENT DOCUMENTS

| | | | |
|---|---|---|---|
| 3,469,935 A | | 9/1969 | Hrishikesan et al. |
| 4,560,465 A | * | 12/1985 | Yu et al. ............ 208/59 |
| 4,982,027 A | | 1/1991 | Korff et al. |
| 5,043,077 A | * | 8/1991 | Chandler et al. ............ 210/698 |
| 5,308,500 A | | 5/1994 | Schwarzbach |
| 5,441,648 A | | 8/1995 | Lidzey |
| 5,529,566 A | | 6/1996 | Weil |
| 5,877,393 A | | 3/1999 | Webster |
| 6,050,929 A | | 4/2000 | Forrester |
| 6,153,108 A | | 11/2000 | Klock et al. |
| 6,238,570 B1 | | 5/2001 | Sivavec |
| 6,245,200 B1 | * | 6/2001 | Wilcoxon ............ 204/157.15 |
| 6,342,162 B1 | | 1/2002 | Heidenreich |
| 6,464,864 B2 | | 10/2002 | Sivavec |
| 6,476,287 B1 | | 11/2002 | Hale, III et al. |
| 6,896,817 B2 | | 5/2005 | Bowers |
| 6,906,235 B2 | | 6/2005 | Funakoshi et al. |
| 2005/0173350 A1 | | 8/2005 | Bowers |

FOREIGN PATENT DOCUMENTS

| | | |
|---|---|---|
| GB | 1434341 | 5/1976 |
| JP | 48102094 A | 12/1973 |

OTHER PUBLICATIONS

Han et al., Development of Pellet-type Adsorbents for removal of Heavy Metal Ions from Aqueous Solutions Using Red Mud, 2002, J.Ind.Eng. Chem., vol. 8, No. 2, pp. 120-125.*
Partial European Search Report dated Feb. 20, 2008 for EP 07250853.
Alvarez, J. et al., "Characterization and Deactivation Studies of an Activated Sulfided Red Mud Used as Hydrogenation Catalyst," Applied Catalysis A: General, Elsevier Science, vol. 167, No. 2, (Feb. 27, 1998).
Database Compendex [Online] Engineer Information Inc., Forssberg K. S. E. et al., "Adsorption of Heavy Metal Ions of Pyrrhotite," & Scand J. Metall 1981, vol. 10, No. 5, 1981, pp. 225-230.
Ryle, G., "The Great Red Mud Experiment that Went Radioactive," May 7, 2002 (smh.com.au/articles/2002/05/06/1019441476548.html).
Gupta V. K. et al., "Process development for the removal of lead and chromium from aqueous solutions using red mud—an aluminum industry waste," Water Research, Elsevier, Amsterdam, NL, vol. 35, No. 5, Apr. 2001, pp. 1125-1134.
Bertocchi et al., "Red mud and fly ash for remediation of mine sites contaminated with As, Cd, Cu, Pb and Zn," Journal of Hazardous Materials, Elsevier, vol. 134, No. 1-3, Dec. 1, 2005, pp. 112-119.
Database WPI Week 199604, Derwent Publications Ltd., London GB: An 1996-038394 & RU 2035977C1 (Gorenbein A. E.) May 27, 1995.
Lopez E. et al., "Adsorbent properties of red mud and its use for wastewater treatment," Water Research, Elsevier, Amsterdam, NL, vol. 32, No. 4, Apr. 1988, pp. 1314-1322.
Danis et al., "Chromate removal from water using red mud and crossflow microfiltration," Desalination, Elsevier, Amsterdam, NL, vol. 181, No. 1-3, Sep. 5, 2005, pp. 135-143.
Han Jingtai: "Arsenic removal from water by iron-sulphide minerals" Chinese Science Bulletin, vol. 45, No. 15, Aug. 2000, pp. 1430-1434.
European Search Report for EP 07 25 0853 completed Apr. 29, 2008.
Author: Gao, A J; Meyn S; Oelert H H Title date: May 14, 1993 Source: Erdoel & Kohle, Erdgas, Petrochemie (1993), 46(2), 61-5 CODEN: EKEPAB; ISSN: 0014-0058; English.

* cited by examiner

*Primary Examiner* — Kaj K Olsen
*Assistant Examiner* — Pritesh Darji
(74) *Attorney, Agent, or Firm* — Kenneth E. Darnell

(57) ABSTRACT

Discolored organic compounds (DOC) may be extracted from a medium using a sorbent composition derived by sulfidation of red mud, which contains hydrated ferric oxides derived from the Bayer processing of bauxitic ores. In some aspects, the sorbent composition is slurried with the medium. In other aspects, the sorbent composition is formed into pellets or the like, which are contacted with the medium. The red mud (along with adsorbed contaminants) is then separated from the water using any suitable technique, such as filtration, sedimentation, or centrifugation.

44 Claims, No Drawings

METHOD OF SORBING DISCOLORED ORGANIC COMPOUNDS FROM WATER

CROSS REFERENCE TO RELATED APPLICATION

This application is a continuation-in-part of application Ser. No. 11/277,282, filed Mar. 23, 2006, now U.S. Pat. No. 7,763,566, the disclosure of which is hereby incorporated hereinto by reference in its entirety.

DESCRIPTION OF RELATED ART

A variety of processes has been and is currently used to remove unacceptable levels of discolored organic compounds (DOC) present in water. DOC is also sometimes referred to total organic carbon (TOC), organic color, and color and natural organic matter. Non-limiting examples of DOC include humic acids, fulvic acids, tannins, and other organic compounds formed by degradation of plant residues or by industrial processes such as pulping and paper making.

Removal of DOC from water is necessary to provide high quality water suitable for distribution and consumption by humans, animals, industrial processes, and also reductions of public health discharges from facilities, as well as discharges from food processing, mining waste, as well as transportation, sewage and storm runoff. In addition, environmental regulations have been enacted to assure aesthetic appearance of public waterways by setting color standards for industrial discharges such as from paper mills.

Most of the compounds and materials described as DOC are very hydrophilic and not easily separable from water. A number of processes has been and is currently used to separate DOC to make water medically and aesthetically acceptable. Examples of such processes include coagulation and sedimentation, chlorination, ozonation, membrane filtration (reverse osmosis (RO)), and use of anion exchange resins. Each of these processes has disadvantages either because of residuals (e.g., trihalomethanes from chlorination) or because of high capital and/or operating costs. For example, one of the more actively promoted processes uses magnetite core anion exchange resin, which costs about $12 per liter, requires magnetic separation from water, and must be recycled (regenerated) repeatedly to meet cost requirements. RO and ozonation also have significant capital and operating costs.

In addition to natural and industrial DOC contamination of water found traditionally in surface and subsurface water, recent research has found that there is a long list of potentially health damaging compounds in water sources including phthalates, bisphenol compounds, hormones, insecticides, herbicides, pharmaceutical as well as illicit drug residues.

Red mud is an undesirable by-product and major pollutant from the Bayer Process. Bayer caustic leaching of bauxite is the principal process for production of alumina. This process relies on the solubility of aluminous minerals in hot (e.g., 125-250° C.) sodium hydroxide solution and the insolubility of most of the remaining minerals (iron, titanium compounds and silica), which are either insoluble or react and re-precipitate. The insoluble, iron rich residue byproduct is known as "red mud." Red mud can contain from about 17.4 to 37.5% iron (Fe) (Bauxite Residue Fractionation with Magnetic Separators, D. William Tedder, chapter 33, Bauxite symposium, 1984, AIME 1984). Red mud is a complex mixture of finely divided hydrated iron oxides with a wide variety of lesser minerals (Al, Na, Ti, Si, Ca, Mg) and traces of over a score of other elements (Cr, Ni, Zn, Pb, As, etc). These hydrous iron oxides have extraordinary sorptive and complexing properties.

Red mud is a very hydrophilic, high pH slime which is extremely difficult to dewater by filtration or sedimentation means. This complicates and limits its utility as a sorbent in aqueous systems.

Red mud has been proposed as a sorbent for heavy metals, cyanides, phosphates, and the like (David McConchie, Virotec website: virotec.com/global.htm). However, the sorptive and release properties of red mud are not always complementary. Depending on the source of a particular red mud, it can also leach out significant amounts of toxic pollutants such as radioactive thorium, uranium, chromium, barium, arsenic, copper, zinc, cobalt, as well as lead, cadmium, beryllium, and fluorides.

The potential problems involved with use of red mud to control pollution are highlighted in an e-newsletter article entitled "The Great Red Mud Experiment that Went Radioactive"—Gerard Ryle, May 7, 2002 (smh.com.au/articles/2002/05/06/1019441476548.html). This experiment conducted by the Western Australian Agricultural Department involved placing 20 tonnes of Alcoa red mud per hectare on farmland in order to stop unwanted phosphorous from entering waterways. An unintended result of this application was that runoff waters showed excessive quantities of copper, lead, mercury, arsenic, and selenium. Emaciated cattle grazing on such land exhibited high chromium, cadmium, and fluoride levels. Each hectare contained up to 30 kilograms of radioactive thorium. The disastrous red mud application test was abruptly terminated after five years.

It is therefore evident that extreme caution must be exercised in selecting and testing red mud before attempting to use it to sorb toxic compounds.

Furthermore, the capacity of red mud to capture and hold toxic substances such as mercury and related metals is not adequate to eliminate traces of these metals in leachate. The possibility also exists that sorption of one toxic pollutant may release other pollutants. As a result, use of red mud as a sorbent to achieve drinking water standards can be problematic.

There is a need for a simple, direct, readily operable, and low cost process for removal of discolored organic compounds.

SUMMARY

In one aspect, a process of treating a medium containing discolored organic compounds (DOC) comprises contacting the medium with a sorbent comprising sulfidized red mud, and separating the sorbent from the medium. The sorbent (containing adsorbed contaminants) may be separated from the medium using any suitable technique, such as sedimentation, filtration, centrifugation, or the like.

In one aspect, the sorbent is slurried with the medium. In another aspect, the sorbent is provided in the form of pellets or the like, through which the medium is passed.

Sulfidized red mud may be prepared by reacting a sulfidizing compound and red mud. Red mud contains hydrated ferric oxides derived from Bayer processing of bauxitic ores. Non-limiting examples of sulfidizing compounds include $H_2S$, $Na_2S$, $K_2S$, $(NH_4)_2S$, and $CaS_x$. The sulfur content of the reaction product typically is from about 0.2 to about 10% above the residual sulfur in the red mud.

The sorbent is effective for sorbing various contaminants, such as DOC, which are not effectively sorbed by red mud. Conversely, red mud is effective for sorbing other contaminants, such as arsenic, which are not effectively sorbed by the sulfidized red mud sorbent. Thus, some treatments can benefit by using both red mud and sulfidized red mud, e.g., either in the same sorbent composition or in separate treatment stages. Such sorbent combinations potentially can allow for the extraction of a wider range of contaminants.

DETAILED DESCRIPTION

Sulfidized red mud may be used in the preparation of potable water, e.g., meeting drinking water standards. The sulfidized red mud may be prepared by the sulfidation of red mud, which contains hydrated ferric oxides derived from the Bayer processing of bauxitic ores. Sulfidation can be achieved by reacting the red mud with one or more sulfidizing compounds such as $H_2S$, $Na_2S$, $K_2S$, $(NH_4)_2S$, and $CaS_x$. Unlike red mud, which is very hydrophilic, the sulfidized red mud is lyophobic and more readily dewatered. As a result, sulfidized red mud exhibits significantly faster filtration rates than those exhibited by red mud.

The relative amount of the sulfidizing compound usually is selected so that the sulfur content of the reaction product is from about 0.2 to about 10% above the residual sulfur content of the red mud. The weight ratio of sulfidizing compound to red mud will vary on the type of sulfidizing compound used and the desired level of sulfidation for a particular end use. Most often, the sulfidizing compound and red mud are combined at a weight ratio of from about 1:40 to about 1:4, more usually from about 1:25 to about 1:6, and even more usually from about 1:20 to about 1:8.

The conditions under which the red mud can be sulfidized depend on such factors as the identity of the sulfidizing compound(s) and the intended use of the resulting sorbent. In some cases, sulfidation can be accomplished by mixing red mud and the sulfidizing compound at ambient temperature and atmospheric pressure. In general, higher sulfur contents can be obtained when the reaction is carried out at elevated temperatures and/or elevated pressures. Sulfur content in the reaction product also can be influenced by factors such as the sulfur content of the sulfidizing agent. For example, compounds with higher sulfur contents, such as calcium polysulfide, typically yield products having higher sulfur contents. In general, the sulfidized red mud material is amorphous and does not contain pyrrhotite, a magnetic and crystalline material of the formula $Fe_{(1-x)}S$, where $x=0$ to $0.2$.

When using gaseous sulfidizing compounds, such as hydrogen sulfide ($H_2S$), it may be desirable to conduct the reaction at elevated temperature and/or elevated pressure to increase the rate of reaction and the sulfur content of the resulting sorbent. Suitable exemplary reaction temperatures range from about 40 to about 200° C., often from about 80 to about 120° C. The reaction pressure typically ranges from about 1 to about 225 psi, often from about 30 to about 70 psi (absolute).

The amount of sulfidized red mud used in the processes described herein may vary over a wide range depending on such factors as the identity and relative amounts of the contaminant(s) present in the medium. Many types of DOC may be effectively sorbed with relatively small quantities of sulfidized red mud. By way of example, the amount of sulfidized red mud may range from about 0.005 to about 0.5 g/mL, and often ranges from about 0.01 to about 0.1 g/mL.

In one aspect, the sorbent is slurried together with the medium containing the DOC and any other contaminant(s) to be extracted. Suitable mixing equipment can be used to provide sufficient contact between the sorbent and the contaminant(s). The sorbent, which forms a complex with the contaminant(s), can then be separated from the slurry using one or more conventional techniques such as filtration, sedimentation, or centrifugation.

In another aspect, the sulfidized red mud sorbent is processed into pellets or the like using conventional pelletizing or extrusion equipment. Preparing the sorbent in pellet form can simplify its handling and/or use. The pellets may be incorporated into filters of conventional construction for use in a variety of industrial or consumer filtration applications, such as filters usable for preparing potable water.

The extent to which contaminant(s) may be removed from the medium in which they are present may vary depending on such factors as whether the process is intended to produce potable water. The extent of removal may be quantified using any known techniques, but in the case of DOC often colorimetric scales are used, such as color value (CV) and/or absorbance, as described in Example 8 below. The extent of removal of the contaminant(s) may be increased, for example, by implementing multiple passes (e.g., multiple stages) as may be needed to achieve the desired optical properties and/or purity.

It has been found that the sulfidized red mud sorbent is effective for sorbing various contaminants, such as DOC, which are not effectively sorbed by red mud. On the other hand, red mud is effective for sorbing other contaminants, such as arsenic, which are not effectively sorbed by sulfidized red mud. For the treatment of mediums having contaminants in both of these categories, the use of red mud and sulfidized red mud in tandem, either in the same sorbent composition or in sequential treatment stages (e.g., red mud followed by sulfidized red mud) can be more effective than using either sorbent alone.

EXAMPLES

Example 1

This example shows the preparation of red mud. A 1 kg sample of red mud received from Sherwin Alumina Company of Corpus Christi, Tex. was slurried at 15% solids in demineralized water and filtered on a Buchner funnel. The resulting filter cake was re-slurried with demineralized water, re-filtered, and used as the starting material in Example 2.

Example 2

This example illustrates the preparation of sulfidized red mud using hydrogen sulfide ($H_2S$). Washed red mud (100 g) from Example 1 was slurried in demineralized water at 15% solids and the stirred slurry was saturated with hydrogen sulfide for 30 minutes at ambient temperature. The sample was dried overnight at 100° C. and the resulting cake was pulverized.

Example 3

This example shows the preparation of sulfidized red mud using $H_2S$ under pressure (30 psi) in a Parr Bomb. The sulfidation procedure of Example 2 was repeated using a Laboratory Parr Bomb. After saturation of the slurry with hydrogen sulfide gas, the bomb was sealed and heated four hours at 121° C. while stirred. The bomb was then cooled, depressurized and the contents filtered, dried, and pulverized.

Table 1 shows the results of analysis using X-Ray Diffraction of the red mud of Example 1 and the sulfidized red mud of Example 3.

TABLE 1

| Mineral Name | Chemical Formula | Ex. 1 | Ex. 3 |
|---|---|---|---|
| Hematite | $Fe_2O_3$ | 37 | 22 |
| Goethite | $FeO(OH)$ | 10 | 10 |
| Gibbsite | $Al(OH)_3$ | <10 | 15 |
| Boehmite | $AlOOH$ | — | — |
| Calcite | $CaCO_3$ | <10 | <10 |
| Anatase | $TiO_2$ | <3 | — |
| Perovskite | $CaTiO_3$ | — | <10 |
| Ilmenorutile | $(Ti, Nb, Ta, Fe)O_2$ | — | <5? |
| Pseudorutile | $Fe_2Ti_3O_9$ | — | <5? |
| Pyrrhotite | $Fe_{(1-x)}S$ | — | — |
| Rutile | $TiO_2$ | — | — |
| Quartz | $SiO_2$ | — | — |
| — | $CaTi_3Al_8O_{19}$ | — | — |
| — | $Na_8Al_6Si_6O_{24}SO_4 \cdot 3H_2O$ | 17 | <10 |
| Amorphous | — | <20 | <25 |
| Unidentified | — | <5 | <5 |

The results of the analysis showed that both samples (Examples 1 and 3) contained amorphous material.

Example 4

This example illustrates the preparation of sulfidized red mud using ammonium sulfide $(NH_4)_2S$. Red mud (200 g) was dispersed in 600 grams of deionized (DI) water in a Waring Blender for 5 minutes. Ammonium sulfide (10 g) was added and the slurry was heated with stirring on a hot plate for 1 hr. at 60° C. It was then filtered and dried at 90° C.

Example 5

This example shows the preparation of sulfidized red mud using sodium sulfide $(Na_2S)$. The procedure of Example 2 was repeated using sodium sulfide instead of ammonium sulfide.

Example 6

This example illustrates the preparation of sulfidized red mud using calcium polysulfide $(CaS_x)$. The procedure of Example 2 was repeated using 33.5 g of 30% solution of Cascade calcium polysulfide.

Example 7

Table 2 summaries the sulfur content of the red mud (RM) of Example 1 and the sulfidized red mud (SRM) of Examples 2, 3, 4, 5, and 6.

TABLE 2

| Code | Description | Example | S (wt %) |
|---|---|---|---|
| RM | Red Mud | 1 | 0.19 |
| SRM-2 | Sulfidized Red Mud $H_2S$ | 2 | 0.48 |
| SRM-3 | Sulfidized Red Mud $H_2S$ w/ Pressure | 3 | 0.90 |
| SRM-4 | Sulfidized Red Mud $(NH_4)_2S$ | 4 | 0.46 |
| SRM-5 | Sulfidized Red Mud $Na_2S$ | 5 | 0.62 |
| SRM-6 | Sulfidized Red Mud $CaS_x$ | 6 | 1.19 |

A complete analysis of RM, SRM-3, SRM-4, SRM-5, SRM-6 is given in Table 3 below. The analysis reveals that filtration and washing during preparation of sulfidized red mud extracts sodium chloride (except for SRM-5) and reduces bound water in the red mud. It is notable that very small amounts of reacted sulfur have such a profound effect on the chemical and physical properties of red mud.

TABLE 3

| | | Weight % | | | | | | | | | | | |
|---|---|---|---|---|---|---|---|---|---|---|---|---|---|
| Code | Description | $Na_2O$ | MgO | $Al_2O_3$ | $SiO_2$ | $P_2O_5$ | S | Cl | $K_2O$ | CoO | $TiO_2$ | MnO | $Fe_2O_3$ | BaO |
| RM | Control | 4.73 | 0.12 | 17.1 | 8.23 | 1.14 | 0.19 | 0.20 | 0.06 | 6.79 | 6.12 | 0.73 | 39.9 | 0.02 |
| SRM-3 | $H_2S$ (b) | 3.94 | 0.14 | 14.6 | 9.14 | 1.38 | 0.90 | 0.11 | 0.05 | 6.36 | 6.79 | 0.90 | 46.2 | 0.02 |
| SRM-4 | $(NH_4)_2S$ | 4.39 | 0.13 | 17.9 | 9.24 | 1.26 | 0.46 | 0.15 | 0.04 | 8.82 | 6.95 | 0.85 | 42.3 | 0.02 |
| SRM-5 | $Na_2S$ | 5.20 | 0.11 | 17.2 | 8.56 | 1.15 | 0.62 | 0.15 | 0.03 | 7.53 | 6.22 | 0.75 | 41.5 | 0.02 |
| SRM-6 | $CaS_x$ | 4.44 | 0.09 | 16.2 | 8.41 | 1.29 | 1.19 | 0.14 | 0.04 | 9.32 | 6.60 | 0.81 | 41.2 | 0.02 |

| | | PPM | | | | | | | | | | |
|---|---|---|---|---|---|---|---|---|---|---|---|---|
| Code | Description | V | Cr | Co | Ni | W | Cu | Zn | As | Sn | Pb | Mo | Sr | U |
| RM | Control | 1100 | 1258 | 99 | 680 | 16 | 119 | 416 | 47 | 247 | 144 | <10 | 424 | 65 |
| SRM-3 | $H_2S$ (b) | 1252 | 1506 | 121 | 860 | 23 | 138 | 458 | 44 | 177 | 180 | <10 | 498 | 57 |
| SRM-4 | $(NH_4)_2S$ | 1093 | 1379 | 120 | 762 | 30 | 146 | 648 | 46 | 155 | 176 | 13 | 447 | 36 |
| SRM-5 | $Na_2S$ | 942 | 1272 | 103 | 695 | 24 | 130 | 504 | 31 | 181 | 159 | 11 | 387 | 39 |
| SRM-6 | $CaS_x$ | 1054 | 1364 | 113 | 780 | 29 | 138 | 471 | 49 | 155 | 165 | 13 | 431 | 50 |

| | | PPM | | | | |
|---|---|---|---|---|---|---|
| Code | Description | Th | Nb | Zr | Rb | Y |
| RM | Control | 186 | 188 | 1757 | 24 | 673 |
| SRM-3 | $H_2S$ (b) | 199 | 207 | 1503 | 21 | 831 |
| SRM-4 | $(NH_4)_2S$ | 159 | 153 | 1888 | <10 | 748 |
| SRM-5 | $Na_2S$ | 123 | 148 | 1659 | <10 | 695 |
| SRM-6 | $CaS_x$ | 146 | 146 | 1767 | <10 | 745 |

Example 8

This example illustrates clarification of Okefenokee Swamp water with sulfidized red mud.

500 ml of Okefenokee Swamp water (Sample I) was adjusted to pH 7 with dilute NaOH and mixed with 10 grams of SRM (made with 10% ammonium sulfide) in a Waring blender at high speed for 5 minutes. The mixture was transferred to a beaker and allowed to stir an additional hour using a magnetic stirrer.

The suspension was filtered and the color value of the filtrate was determined with a LaMotte TC-3000e colorimeter. Another 10 grams of SRM was then added and the procedure was repeated a second time ($2^{nd}$ Pass). The filtrate was again evaluated for color. Results are given in Table 4 and showed that the treated sample was nearly colorless.

TABLE 4

Absorbance Testing of Okefenokee "Black" Water (Sample I)

| Sample Designation | Color Value (CV) (375 nm) |
|---|---|
| Control (untreated) | 347 |
| $1^{st}$ Pass SRM | 38.9 |
| $2^{nd}$ Pass SRM | 18.8 |

Another sample of Okefenokee "Black" Water (Sample II) was treated with sulfidized red mud according to the above procedure. The absorbance was reduced 90% to nearly colorless, as shown in Table 5.

TABLE 5

Absorbance Testing of Okefenokee "Black" Water (Sample II)

| Sample Designation | Absorbance* |
|---|---|
| Control (untreated) | 0.063 |
| Sample II | 0.0063 |

*Fisher Genesys5 Spectrophotometer 500 nm

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method of treating a medium containing discolored organic compounds, the method comprising contacting the medium with a sorbent comprising sulfidized red mud, the sulfidized red mud being a reaction product of a sulfidizing compound and red mud at a reaction temperature from ambient temperature up to about 200° C. and a reaction pressure from atmospheric pressure up to about 30 psi in aqueous solution, and separating the sorbent from the medium.

2. The method of claim 1, wherein the medium contains an acid selected from the group consisting of fulvic acid, humic acid, tannic acid, and combinations thereof.

3. The method of claim 1, wherein the sorbent is separated from the medium using at least one of filtration, sedimentation, and centrifugation.

4. The method of claim 1, wherein the sorbent is present in the form of pellets.

5. The method of claim 4, wherein the pellets are provided in a filter.

6. The method of claim 1, wherein the sorbent is slurried with the medium.

7. The method of claim 1, further comprising contacting the medium with red mud prior to contact with the sorbent comprising sulfidized red mud.

8. The method of claim 7, wherein the medium is contacted simultaneously with red mud and the sorbent comprising sulfidized red mud.

9. The method of claim 7, wherein the medium is contacted sequentially with red mud and subsequently with the sorbent comprising sulfidized red mud.

10. The method of claim 1 wherein the sulfidizing compound is selected from the group consisting of $H_2S$, $Na_2S$, $K_2S$, $(NH_4)_2S$, $CaS_x$ and combinations thereof.

11. The process of claim 1 wherein the sulfidizing compound comprises $(NH_4)_2S$.

12. The process of claim 1 wherein the reaction product contains from about 0.2 to about 10 weight percent sulfur above residual sulfur initially present in the red mud prior to reaction with the sulfidizing compound.

13. The process of claim 1 wherein the reaction product is formed at a reaction temperature in a range from ambient temperature up to about 60° C.

14. The process of claim 1 wherein the reaction product is formed at ambient temperature.

15. The process of claim 1 wherein the medium comprises water.

16. A process for decolorizing an aqueous solution containing discolored organic compounds, comprising contacting the aqueous solution with a sorbent comprising sulfidized red mud, the sulfidized red mud being a reaction product of a sulfidizing compound and red mud at a reaction temperature from ambient temperature up to about 200° C. and a reaction pressure from atmospheric pressure up to about 30 psi in aqueous solution, and separating the sorbent from the aqueous solution.

17. The process of claim 16 wherein the reaction product contains from about 0.2 to about 10 weight percent sulfur above residual sulfur initially present in the red mud prior to reaction with the sulfidizing compound.

18. The process of claim 16 wherein the sulfidizing compound is selected from the group consisting of $H_2S$, $Na_2S$, $K_2S$, $(NH_4)_2S$, $CaS_x$ and combinations thereof.

19. The process of claim 16 wherein the sulfidizing compound comprises $(NH_4)_2S$.

20. The process of claim 16 wherein the reaction product is formed at a reaction temperature in a range from ambient temperature up to about 60° C.

21. The process of claim 16 wherein the reaction product is formed at ambient temperature.

22. The process of claim 16 wherein the aqueous solution contains a substance selected from the group consisting of fulvic acid, humic acid, tannic acid, lignins and combinations thereof 23. The process of claim 16 wherein the sorbent is separated from the aqueous solution using at least one of filtration, sedimentation and centrifugation.

24. The process of claim 16 wherein the sorbent is present in the form of pellets.

25. The process of claim 24 wherein the pellets are provided in a filter.

26. The process of claim 16 wherein the sorbent is slurried with the aqueous solution.

27. The process of claim 16 and further comprising contacting the aqueous solution with red mud prior to contact with the sorbent comprising sulfidized red mud.

28. The process of claim 27 wherein the aqueous solution is contacted simultaneously with red mud and the sorbent comprising sulfidized red mud.

29. The process of claim 27 wherein the aqueous solution is contacted sequentially with red mud and the sorbent comprising sulfidized red mud.

30. A process for treating water containing discolored organic compounds comprising contacting the water with a sorbent comprising sulfidized red mud, the sulfidized red mud comprising a reaction product of a sulfidizing compound and red mud at a reaction temperature up to about 200° C. and a reaction pressure from atmospheric pressure up to about 30 psi.

31. The process of claim 30 wherein the sulfidizing compound comprises $(NH_4)_2S$.

32. The process of claim 30 wherein the reaction product contains from about 0.2 to about 10 weight percent sulfur above residual sulfur initially present in the red mud prior to reaction with the sulfidizing compound.

33. The process of claim 30 wherein the reaction product is formed at a reaction temperature from ambient temperature up to about 60° C.

34. The process of claim 30 wherein the reaction product is formed at ambient temperature.

35. The process of claim 30 wherein the sulfidized red mud is formed at a temperature of less than about 200° C.

36. The process of claim 30 wherein the water is contacted with red mud prior to contact with the sorbent comprising sulfidized red mud.

37. The process of claim 36 wherein the water is contacted simultaneously with red mud and the sorbent comprising sulfidized red mud.

38. The process of claim 36 wherein the water is contacted sequentially with red mud and the sorbent comprising sulfidized red mud.

39. The process of claim 30 wherein the water contains a substrate selected from the group consisting of fulvic acid, humic acid, tannic acid, lignins and combinations thereof.

40. The process of claim 30 wherein the sorbent is separated from the water using at least one of filtration, sedimentation and centrifugation.

41. The process of claim 30 wherein the sorbent is present in the form of pellets.

42. The process of claim 30 wherein the pellets are provided in a filter.

43. The process of claim 30 wherein the sorbent is slurried with the water.

44. The process of claim 30 wherein the sulfidizing compound is selected from the group consisting of $H_2S$, $Na_2S$, $K_2S$, $(NH_4)_2S$, $CaS_x$ and combinations thereof.

* * * * *